(12) United States Patent
Nagai et al.

(10) Patent No.: US 9,506,564 B2
(45) Date of Patent: *Nov. 29, 2016

(54) SEAL RING

(71) Applicant: Kabushiki Kaisha Riken, Chiyoda-ku, Tokyo (JP)

(72) Inventors: Junya Nagai, Kashiwazaki (JP); Mika Saito, Kashiwazaki (JP); Tomoya Shibano, Kashiwazaki (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 187 days.

This patent is subject to a terminal disclaimer.

(21) Appl. No.: 14/234,100

(22) PCT Filed: Dec. 19, 2012

(86) PCT No.: PCT/JP2012/082964
§ 371 (c)(1),
(2) Date: Jan. 21, 2014

(87) PCT Pub. No.: WO2013/094654
PCT Pub. Date: Jun. 27, 2013

(65) Prior Publication Data
US 2014/0319779 A1 Oct. 30, 2014

(30) Foreign Application Priority Data

Dec. 23, 2011 (JP) ................................. 2011-282516

(51) Int. Cl.
*F16J 9/12* (2006.01)
*F16J 15/16* (2006.01)
(Continued)

(52) U.S. Cl.
CPC ............... *F16J 15/16* (2013.01); *F16J 15/002* (2013.01); *F16J 15/441* (2013.01)

(58) Field of Classification Search
CPC ........ F16J 15/441; F16J 15/002; F16J 15/16; F16J 15/3272
USPC .......................................................... 277/436
See application file for complete search history.

(56) References Cited

U.S. PATENT DOCUMENTS

| 6,938,879 | B2* | 9/2005 | Bancroft et al. | 251/306 |
| 7,523,944 | B2* | 4/2009 | Hatori | 277/460 |
| 8,002,237 | B2* | 8/2011 | Hubacek et al. | 251/172 |
| 2002/0041071 | A1* | 4/2002 | Mittler et al. | 277/496 |
| 2012/0018957 | A1* | 1/2012 | Watanabe | 277/387 |
| 2013/0127120 | A1* | 5/2013 | Nagai et al. | 277/500 |

FOREIGN PATENT DOCUMENTS

| CN | 1768224 A | 5/2006 |
| CN | 102483162 A | 5/2012 |

(Continued)

OTHER PUBLICATIONS

International preliminary report on patentability mailed Jul. 3, 2014, corresponds to PCT/JP2012/082964.

*Primary Examiner* — Vishal Patel
*Assistant Examiner* — Thomas Neubauer
(74) *Attorney, Agent, or Firm* — Hauptman Ham, LLP

(57) ABSTRACT

A plurality of concave portion to be spaced apart from each other in a circumferential direction through a pillar portion is formed in an inner circumferential side of a side surface of a seal ring mounted in a shaft groove formed in an outer circumferential surface of a shaft. The concave portion including a deepest portion, and two inclined portions, connects the inclined portion positioned at an opposite side in a rotational direction and the adjacent pillar portion with a curved surface having a shape convex, and further, makes a width in the circumferential direction of the inclined portion of the rotational direction side smaller than a width in the circumferential direction of the inclined portion of the opposite side in the rotational direction.

5 Claims, 9 Drawing Sheets

(51) Int. Cl.
  *F16J 15/00* (2006.01)
  *F16J 15/44* (2006.01)

(56) References Cited

FOREIGN PATENT DOCUMENTS

| JP | 8121603 A | 5/1996 |
| JP | 8-159290 A | 6/1996 |
| JP | 3437312 B2 | 8/1996 |
| JP | 9210211 A | 8/1997 |
| JP | 2005212004 A | 8/2005 |
| JP | 20069897 A | 1/2006 |
| JP | 2007107547 A | 4/2007 |
| WO | 2004090390 A1 | 10/2004 |
| WO | 2011105513 A1 | 9/2011 |
| WO | 2011162283 A1 | 12/2011 |

\* cited by examiner (A)

(B)

(A)

(B)

SEAL RING

RELATED APPLICATIONS

The present application is a National Phase of International Application Number PCT/JP2012/082964, filed Dec. 19, 2012, and claims priority from, Japanese Application Number 2011-282516, filed Dec. 23, 2011, the disclosures of which are hereby incorporated by reference herein in their entirety.

TECHNICAL FIELD

The present invention relates to a seal ring, and more particularly, to a seal ring that is used in a hydraulic device such as an automatic transmission for an automobile, or the like.

BACKGROUND ART

Recently, in order to aim to improve fuel efficiency of an automobile, a reduction in a drive loss of an automatic transmission is required. A seal ring is mounted in the automatic transmission for the purpose of hydraulic sealing, but a friction loss of the seal ring leads to a drive loss of the automatic transmission. For this reason, a reduction in friction of the seal ring becomes an important problem. Further, because a capacity of an oil pump of the automatic transmission accounts for a great part of the drive loss, a reduction in an amount of oil leakage from the seal ring and a reduction in a capacity of the oil pump are required. As such, in order to reduce the drive loss of the automatic transmission and improve fuel efficiency of the automobile, a low friction function and a low leakage function are required for the seal ring.

FIG. 1 illustrates a basic structure of a hydraulic circuit using the seal ring. A seal ring 1 is mounted in a shaft groove (ring groove) 4 that is formed at both sides in an axial direction of a hydraulic pressure passage 3 of an outer circumferential surface of a shaft 2. A pressure receiving side surface 11 and an inner circumferential surface 12 of the seal ring receive operating oil supplied from the hydraulic pressure passage 3, an outer circumferential surface 13 of the seal ring comes into contact with an inner surface of a housing 5, and a contact side surface 14 of the seal ring comes into contact with a side surface of the shaft groove 4, thereby sealing the hydraulic pressure. In general, the shaft 2 rotates and the housing 5 is fixed, but there is also a combination reverse to the former combination.

In order to reduce friction (friction loss) of the seal ring, a method is usually adopted which reduces a pressure receiving load that presses the contact side surface of the seal ring, which becomes a main sliding surface, against the ring groove. Specifically, a seal ring is adopted which has a cross-sectional shape in which the supplied hydraulic pressure is applied between the contact side surface of the seal ring and the ring groove, thereby reducing the pressure receiving load by an operation of a cancellation load.

Patent Literature 1 discloses a method in which a side surface of a seal ring is formed in a tapered shape in which a width in an axial direction is decreased from an outer circumferential side to an inner circumferential side, so as to generate a cancellation load between the side surface of the seal ring and a ring groove, thereby aiming to reduce a pressure receiving load. The tapered shape of the side surface may drastically reduce the pressure receiving load, and has been known at present as a shape of the seal ring, which causes the smallest friction.

Further, as illustrated in FIG. 2(A), Patent Literature 2 discloses a seal ring having concave portions (pockets) 6 formed to be spaced apart from each other in a circumferential direction at an inner circumferential side of at least a contact side surface, and a pillar portion 7 disposed between the concave portions 6. As illustrated in FIGS. 2(B) and 2(C), the concave portion 6 is formed by a deepest inclined portion 51 provided so that a width (thickness) in an axial direction of the seal ring becomes thin in an inner circumferential direction, and converging portions 52 positioned at both sides in a circumferential direction of the deepest inclined portion 51 and of which each converges to a point that is the closest to the inner circumferential side of the adjacent pillar portion 7. In this configuration, the friction is reduced by a lifting force 60 which is generated by squeezing oil filled in the concave portion 6 on an inclined surface of the converging portion 52 by rotation of the seal ring, and an effect (cancellation pressure 61) of reducing a pressing load by applying hydraulic pressure in the concave portion 6 of the contact side surface. In addition, as illustrated in FIG. 2(D), in the seal ring of Patent Literature 2, because the side surface of the seal ring comes into sliding contact with the ring groove with surface contact, a leakage flow path of an abutting end gap is not formed, and low leakage characteristics are obtained.

Moreover, Patent Literature 3 discloses a seal ring in which a groove, which is opened in an inner circumferential surface, broadened in an outer diameter direction and a circumferential direction from a deepest portion at the inner circumferential surface side while going forward in a rotational direction of a rotating shaft, and becomes gradually shallow in the outer diameter direction and the circumferential direction from the deepest portion, is provided in a side surface of the seal ring. It is disclosed that in this configuration, an oil film may be widely formed on a side surface that slides with a side wall surface at an anti-seal fluid side of a ring-shaped groove, abrasion may be reduced by eliminating direct contact with the side wall surface, and durability is excellent.

In the seal ring of Patent Literature 1, there is a problem in that an oil leakage occurs from an abutting end gap because the sliding contact between the side surface of the seal ring and the ring groove is a line contact, and a sliding diameter is positioned on the abutting end gap of the seal ring. Meanwhile, friction is reduced by adopting the concave portion of Patent Literature 2, but because this effect is lower than the effect of the seal ring of Patent Literature 1, a seal ring having a more excellent effect of reducing friction is further required. Further, in the configuration of the oil groove (concave portion) of Patent Literature 3, an occurrence of the lifting force by squeezing oil may not be expected, and there is a limitation to reduce friction.

CITATION LIST

Patent Literature

Patent Literature 1: Japanese Patent No. 3437312
Patent Literature 2: WO2004/090390
Patent Literature 3: Japanese Patent Application Laid-Open No. 2006-9897

SUMMARY OF INVENTION

Technical Problem

The present invention has been made in consideration of the above-mentioned situation, and an object is to provide a seal ring which has both low friction characteristics and low leakage characteristics, and reduces a drive loss of an automatic transmission, thereby contributing to improving fuel efficiency for an automobile.

Solution to Problem

The present inventors have intensively studied in view of the object, and as a result, found out that a seal ring includes a plurality of concave portions which is formed in an inner circumferential side of a side surface, which comes into contact with a shaft groove, to be spaced apart from each other in a circumferential direction, and a pillar portion disposed between the concave portions, the concave portion includes a deepest portion having the largest width in an axial direction, and two inclined portions positioned at both sides in a circumferential direction of the deepest portion, the inclined portion positioned at an opposite side in a rotational direction and the adjacent pillar portion are connected by a curved surface having a shape convex toward the pillar portion, and a width in the circumferential direction of the inclined portion of the rotational direction side is smaller than a width in the circumferential direction of the inclined portion of the opposite side in the rotational direction, such that friction is reduced while maintaining low leakage characteristics, thereby completing the present invention. That is, a seal ring of the present invention is characterized in that the seal ring mounted in a shaft groove formed in an outer circumferential surface of a shaft, includes: a plurality of concave portions which is formed in an inner circumferential side of a side surface, which comes into contact with at least the shaft groove, to be spaced apart from each other in a circumferential direction; and a pillar portion disposed between the concave portions, in which the concave portion includes a deepest portion having the largest width in an axial direction, and two inclined portions positioned at both sides in a circumferential direction of the deepest portion, the inclined portion positioned at an opposite side in a rotational direction and the adjacent pillar portion are connected by a curved surface having a shape convex toward the pillar portion, and a width in the circumferential direction of the inclined portion of the rotational direction side is smaller than a width in the circumferential direction of the inclined portion of the opposite side in the rotational direction.

Advantageous Effects of Invention

In the present invention, the inclined portion positioned at an opposite side in a rotational direction and the adjacent pillar portion are connected by a curved surface having a shape convex toward the pillar portion, and a width in the circumferential direction of the inclined portion of the rotational direction side is smaller than a width in the circumferential direction of the inclined portion of the opposite side in the rotational direction. In this configuration, when the shaft (or housing) rotates, oil is squeezed to the tip of the inclined portion (surface) of the opposite side in the rotational direction such that a lifting force is generated (wedge shape effect), thereby reducing friction. Here, because the opposite side in the rotational direction of the concave portion is connected to the pillar portion by a gently inclined curved surface, an effect of squeezing oil is improved, and a lifting force is increased, thereby obtaining an excellent effect of reducing friction. Further, the inclined surface of the rotational direction side where the wedge shape effect may not be expected is reduced as much as possible such that the wedge shape effect may be further improved, and friction may be reduced. In addition, in the seal ring of the present invention, because the contact side surface and the side surface of the ring groove come into surface contact with each other, oil leakage may also be suppressed. As such, because the seal ring of the present invention has two types of characteristics that are low friction characteristics and low leakage characteristics, a drive loss of an automatic transmission may be efficiently reduced.

DESCRIPTION OF EMBODIMENTS

Figure 1:
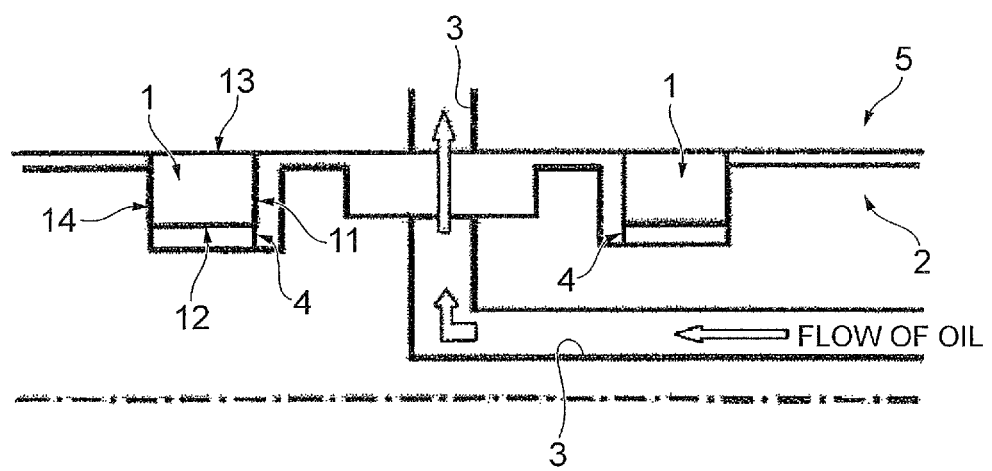
FIG. 1 is a cross-sectional view illustrating a hydraulic circuit in which a seal ring is mounted.

Hereinafter, a seal ring of the present invention will be described in detail with reference to the drawings.

FIG. 3(A) illustrates a perspective view of an aspect of a seal ring of the present invention, and FIG. 3(B) illustrates a linear development view in a circumferential direction when seen from an inner circumferential surface of the seal ring of (A). Further, in the following description, in the development view, a straight line portion is referred to as a flat surface or a flattened surface, and a curved portion is referred to as a curved surface. As illustrated in FIGS. 3(A) and 3(B), in the seal ring of the present invention, an end portion of an opposite side in a rotational direction of a concave portion 6 is configured by a squeezing portion 20 formed with a curved surface having a shape convex toward a pillar portion 7, that is, an upward convex-shaped curved surface in a linear development view (FIG. 3(B)) in a circumferential direction when seen from an inner circumferential surface, and is gently connected to the pillar portion 7. Meanwhile, in the drawing, an end portion of a rotational direction side of the concave portion 6 is connected from a deepest portion 21 to the pillar portion 7 by a sharply inclined portion (surface) 23. For this reason, as the seal ring rotates, oil is squeezed at a tip of the squeezing portion 20 of the opposite side in the rotational direction such that a lifting force is generated (wedge shape effect), and friction is reduced. Here, because the end portion of the opposite side in the rotational direction of the concave portion 6 and the pillar portion 7 are connected with a gently inclined curved surface, an effect of squeezing oil is improved, and the lifting force is increased, thereby further reducing friction. Further, since the rotational direction side where the wedge shape effect may not be expected is configured by the sharply inclined surface 23, an area of the inclined surface is reduced as much as possible, and a structure of the concave portion 6 is made to be configured as the inclined surface of which the most has the wedge shape effect. Hereby, the wedge shape effect may be further improved, and friction may be reduced. A width in a circumferential direction of the inclined surface at the rotational direction side is made to be smaller than a width in a circumferential direction of the inclined surface of the opposite side in the rotational direction so as to reduce an area of the inclined surface which does not have the wedge shape effect, thereby obtaining an effect of reducing friction. In order to obtain a more excellent effect of reducing friction, it is preferred that the width in the circumferential direction of the inclined surface of the rotational direction side is set to be above 0, and 10 or less when the width in the circumferential direction of the inclined surface of the opposite side in the rotational direction is set to be 100. In addition, when considering release property or the like, it is preferred that an inclination angle $\theta$ of the inclined surface 23 of the rotational direction side, that is, an angle formed by the inclined surface 23 and the side surface of the seal ring is set to be 8° to 45°.

In FIG. 3(B), the deepest portion 21 has a predetermined length b in the circumferential direction, and is formed with a flattened surface that is parallel to the side surface. Further, an inclined surface portion 22 is formed which is formed with a curved surface having a shape convex toward the squeezing portion 20 from one side end portion of the deepest portion 21 of the opposite side in the rotational direction and toward the deepest portion 21, that is, a downward convex shape in FIG. 3(B). In addition, a boundary between the inclined surface portion 22 and the squeezing portion 20 is also connected with a gently curved surface. Since the inclined surface portion 22 has the above-mentioned configuration, a more excellent effect of reducing friction may be obtained. However, the inclined surface portion 22 of the seal ring of the present invention is not limited to such a curved surface, and may have a configuration as a single flat surface, or with a flat surface and a curved surface.

Further, although the deepest portion 21 in FIG. 3(B) has a predetermined length b in the circumferential direction, and is formed with a flattened surface that is parallel to the side surface, the deepest portion 21 may have a configuration in which a flattened surface is not provided. For example, a configuration of the concave portion 6 may be made by forming the portion from the tip of the concave portion 6 of the opposite side in the rotational direction to the boundary between the squeezing portion 20 and the inclined surface portion 22 to have a shape convex toward the pillar portion 7, that is, to be an upward convex-shaped curved surface in FIG. 3(B), forming the portion from the boundary between the squeezing portion 20 and the inclined surface portion 22 to the deepest portion 21 to have a shape convex toward the deepest portion 21, that is, to be the inclined surface portion 22 formed with one curved surface having a downward convex shape in FIG. 3(B), and connecting the portion to the pillar portion 7 with the sharply inclined surface 23 after the portion reaches the deepest portion 21. However, in order to obtain a more excellent effect of reducing friction, it is preferred that the deepest portion 21 is configured as a flattened surface that is parallel to the side surface. In this case, the width b of the deepest portion 21 in the circumferential direction is preferably set to be 2 to 20, and more preferably set to be 8 to 16 when a width a of one concave portion 6 in the circumferential direction is set to be 100.

Further, a droop length c of an R curved surface of the squeezing portion 20, that is, a width in the circumferential direction from the tip of the concave portion 6 to the boundary between the squeezing portion 20 and the inclined surface portion 22 is preferably set to be 5 to 20 when a sum (c+d) of widths in the circumferential direction width of the inclined portion at the opposite side in the rotational direction, which are configured by the squeezing portion 20 and the inclined surface portion 22, is set to be 100. In addition, a depth e of the squeezing portion 20, that is, a decline amount in an axial direction at the boundary between the squeezing portion 20 and the inclined surface portion 22 is preferably set to be above 0, and 20 or less when a depth h (a decline amount in the axial direction) of the deepest portion 21 of the concave portion 6 is set to be 100.

The number of concave portions 6 (the number of concave portions that are formed at one side surface of one seal ring) depends on a size of the seal ring, but is preferably 4 to 16 at the seal ring of which an outer diameter (nominal diameter) is about 20 to 70 mm. The width in the circumferential direction of the concave portion 6 is a factor that greatly affects an effect of reducing friction, and it is recognized that an effect of reducing friction is remarkable when a concave portion 6 having a large width in the circumferential direction is formed as compared when a plurality of concave portions 6 having a small width in the circumferential direction width. The width a in the circumferential direction for each one concave portion 6 is preferably 3 to 25, and more preferably 5 to 15 when an outer circumferential length of the seal ring is set to be 100. Further, the width a in the circumferential direction for each one concave portion 6 is preferably set to be 5 to 20 times wider than a width f in the circumferential direction for each one pillar portion 7. The depth h of the concave portion 6, that is, a decline amount in the axial direction of the deepest portion 21 is preferably set to be 2 to 17, and more preferably set to be 5 to 10 when the width in the axial direction of the seal ring is set to be 100.

Figure 4:
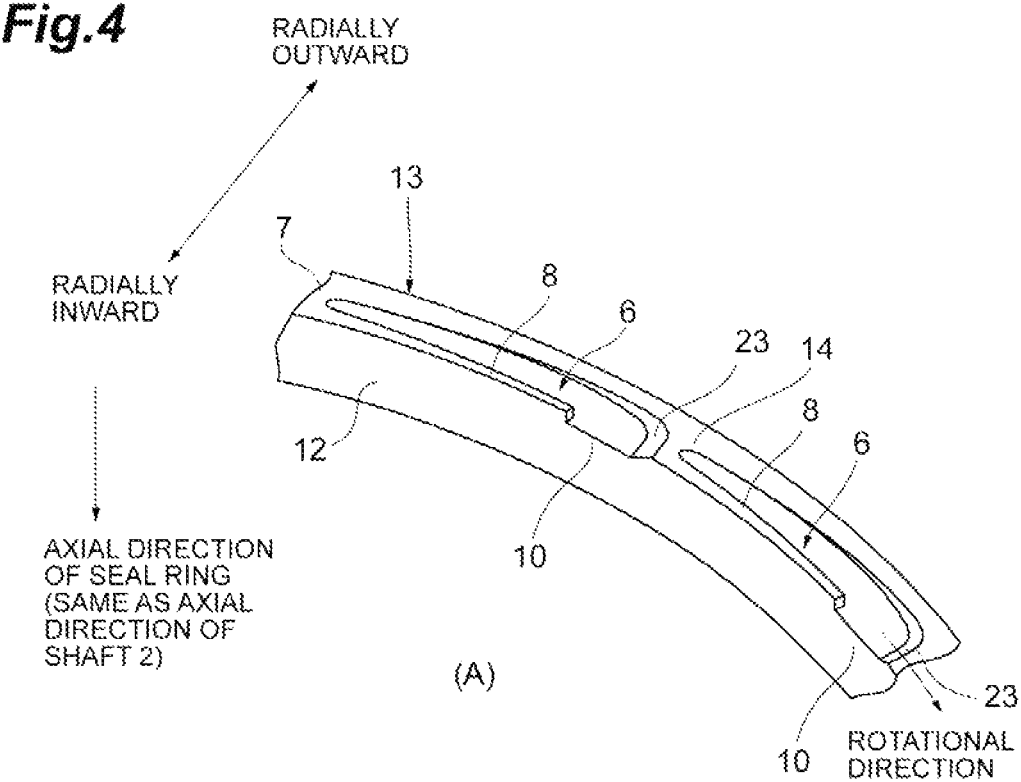
FIG. 4(A) is a partial perspective view illustrating another aspect of a seal ring of the present invention, as seen from the axis of the ring radially outwardly.
FIG. 4(B) is a top view of the ring of FIG. 4(A).
Figure 4:
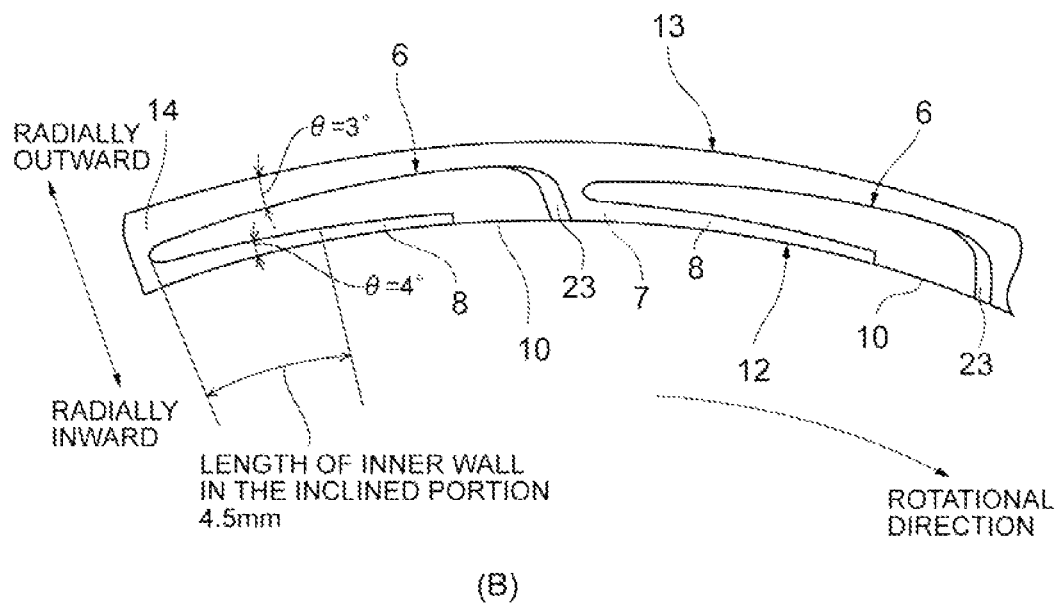

In the seal ring of the present invention, as illustrated in FIG. 4(A), an inner wall 8, and an oil introducing hole 10 opened toward the inner circumferential surface 12 may be provided at the inner circumferential side of the concave portion 6. Here, the inner wall 8 is extended in the circumferential direction along an inner circumferential end portion from the tip of the inclined portion that is configured by the squeezing portion 20 and the inclined surface portion 22, and the oil introducing hole 10, which is opened toward the inner circumferential surface 12, is provided at the rotational direction side of the concave portion 6. Since the inner wall 8 is provided at the inner circumferential side (end portion) of the concave portion 6, a flow of the squeezed oil from a wedge inclined surface to the inner circumferential surface 12 is suppressed, and a larger lifting force is applied by a depth of a wedge cross section and a three dimensional effect of squeezing oil in the circumferential direction. For this reason, an oil film is formed on the pillar portion 7 such that the pillar portion 7 is floated, and at the same time, an intervention of oil on a ring-shaped seal surface, which is positioned at an outer circumferential side of the concave portion 6, is accelerated such that the seal surface transits into in a fluid lubrication state, thereby reducing a coefficient of friction. Further, hydraulic pressure is applied in the concave portion 6 of the contact side surface such that a pressing load is reduced. By these synergistic effects, friction is further reduced. In the seal ring of the present invention, because at the opposite side in the rotational direction of the concave portion 6, the pillar portion 7 and the concave portion 6 are connected in an R shape that is gently inclined, lubrication is further accelerated and a coefficient of friction is reduced, by providing the inner wall 8, as compared to the seal ring of the related art, thereby further reducing friction.

Further, in FIG. 4(A), the inner wall 8 is provided only on the inclined surface of the opposite side in the rotational direction. As the seal ring (shaft) is rotated in a right direction, oil is squeezed to the tip of the squeezing portion of the opposite side (left side) in the rotational direction, thereby generating a lifting force (wedge shape effect). As such, the wedge shape effect occurs at the squeezing portion 20 of the opposite side in the rotational direction, and meanwhile, because an oil film on the inclined surface is difficult to be formed at the rotational direction side, and a lubrication state tends to be hindered, the inner wall is provided only at the opposite side in the rotational direction, thereby further reducing friction. In addition, in the seal ring of the present invention, because the inclined surface of the rotational direction side where the wedge shape effect may not be expected is reduced as much as possible, and the most is configured by the inclined surface having the wedge shape effect, the wedge shape effect may be further improved and friction may be reduced, by providing the inner wall 8.

The length in the circumferential direction of the inner wall 8 is preferably set to be 5 to 95, and more preferably set to be 50 to 95 when the length in the circumferential direction of one concave portion 6 is set to be 100. Within this range, a more excellent wedge shape effect is obtained, and friction is further reduced.

FIG. 4(B) illustrates a scanned image of the contact side surface of the seal ring of FIG. 4(A). Here, the inner wall 8 is inclined by an inclination angle of 4° so that a width in a diameter direction is increased from a location spaced apart by about 4.5 mm from the tip of the inclined portion side, which is configured by the squeezing portion 20 and the inclined surface portion 22 of the concave portion 6, toward the tip of the concave portion 6, that is, so that the width in the diameter direction of the concave portion 6 is decreased. Further, the seal surface of the outer circumferential side of the concave portion 6 is inclined by an inclination angle of 3° so that the width in the diameter direction is increased toward the tip portion of the concave portion 6, that is, so that the width in the diameter direction of the concave portion 6 is decreased. As such, because the seal ring of the present form has the concave portion 6 having a tapered shape in which the width in the diameter direction is decreased toward the tip portion, and the width in the axial direction also becomes smaller (the depth becomes shallow), a three dimensional effect of squeezing oil is further improved. For this reason, a lifting force is increased, and fluid lubrication is made, thereby further reducing friction.

In addition, in the present form, the tip of the concave portion 6 is formed as a curved surface.

In the drawing, the height in the axial direction of the inner wall 8 is set to be nearly identical to a height of the side surface, that is, a tip surface of the inner wall 8 and a side surface where the concave portion 6 is not formed are set to be the same plane. Further, the inner wall 8 is disposed at a part (the opposite side in the rotational direction) in the circumferential direction of the concave portion 6, and the oil introducing hole 10, which is opened toward the inner circumferential surface 12, is formed between the inner wall 8 and the pillar portion 7. However, the configuration of the oil introducing hole 10 is not limited thereto, and an oil introducing hole may be made by forming an inner wall 8 over the entire portion in the circumferential direction of the concave portion 6, and allowing the height in the axial direction to be partially lowered from the side surface of the seal ring.

Figure 5:
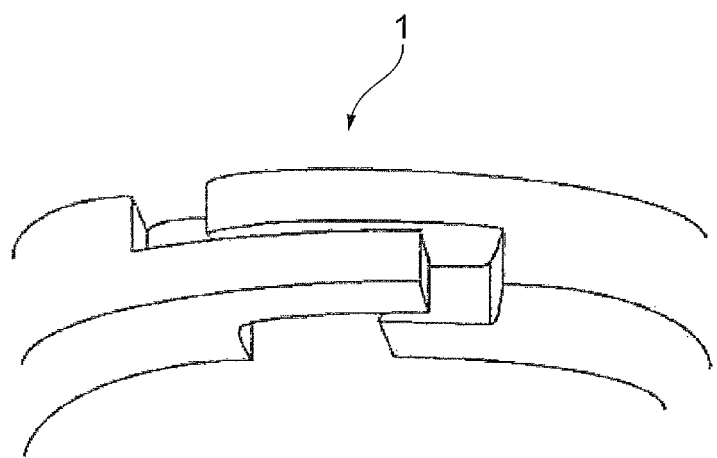
FIG. 5 is a perspective view illustrating an aspect of an abutting end of the seal ring of the present invention.

In the seal ring of the present invention, although an abutting end is provided in consideration of mountability, a shape of the abutting end is not particularly limited, in addition to a right-angle (straight) abutting end, an inclined (angle) abutting end, and a stepped abutting end, a double angle abutting end, a double cut abutting end, a triple stepped abutting end illustrated in FIG. 5, and the like may also be adopted. In order to block a flow of oil into a gap portion of the abutting end and improve sealing characteristics, a double angle abutting end, a double cut abutting end, and a triple stepped abutting end are preferable.

A material of the seal ring of the present invention is not particularly limited, in addition to polyether ether ketone (PEEK), polyphenylene sulfide (PPS), polyimide (PI), and the like, fluorine-based resins such as polytetrafluoroethylene (PTFE), modified polytetrafluoroethylene, ethylene tetrafluoroethylene (ETFE), and the like may also be used. In general, a material obtained by adding an additive such as carbon powder, carbon fibers, or the like into the above-mentioned resins is preferably used.

A method of manufacturing the seal ring of the present invention is not particularly limited, and when a thermoplastic resin such as PEEK, PPS, PI, or the like is used as a material of the seal ring, the seal ring is preferably manufactured by injection molding. By using a mold for injection molding, even a seal ring having a complex concave portion structure or an inner wall structure may be easily manufactured. In addition, when a fluororesin is used, a seal ring may be manufactured by press forming.

EXAMPLES

The present invention will be described in more detail by the following Examples, but the present invention is not limited to these Examples.

Example 1

A seal ring having a concave portion shape of a structure illustrated in FIG. 3(A) was manufactured by injection molding using a PEEK material into which carbon fibers are added. Here, eight concave portions having a depth of a deepest portion to be 0.15 mm, and a width in the circumferential direction to be 25 mm were formed in the contact side surface by setting a curvature of a squeezing portion to be R100. An outer diameter (nominal diameter) of the seal ring was set to be 67 mm, a thickness (width in diameter direction) was set to be 2.3 mm, a width (width in axial direction) was set to be 2.32 mm, and an abutting end was set to be a triple stepped abutting end illustrated in FIG. 5. Further, a depth of the deepest portion was 6.5 when the width in the axial direction of the seal ring is set to be 100, a width in the circumferential direction of the deepest portion was 8 when a length in the circumferential direction of one concave portion is set to be 100, a droop length of the R curved surface of the squeezing portion was 10 when a sum of widths in the circumferential direction of the squeezing portion and the inclined surface portion is set to be 100, and a depth of the squeezing portion was 17 when a depth of the deepest portion of the concave portion is set to be 100.

Comparative Example 1

Figure 2:
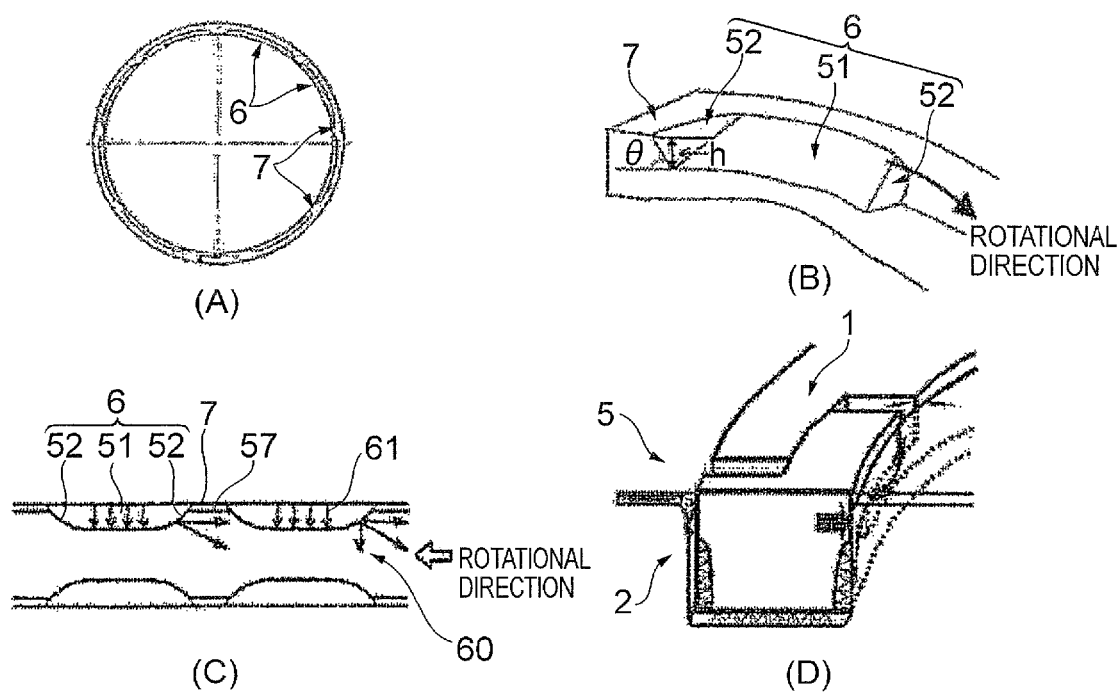
FIG. 2 is a plan view (A) and a perspective view (B) illustrating a structure of a seal ring disclosed in Patent Literature 2, a linear development view (C) of a shape of a concave portion in a circumferential direction when seen from an inner circumferential surface, and a schematic view (D) illustrating a state in which the seal ring disclosed in Patent Literature 2 is mounted in a ring groove.

A seal ring having a concave portion shape of a structure illustrated in FIG. 2(B) was manufactured by injection molding using a PEEK material into which carbon fibers are added. Here, eight concave portions were formed in the contact side surface by setting an inclined surface angle θ of the concave portion to be 16°, and a depth h of a deepest inclined portion 52 to be 0.42 mm. Further, an outer diameter (nominal diameter) of the seal ring was set to be 67 mm, a thickness (width in diameter direction) was set to be 2.3 mm, a width (width in axial direction) was set to be 2.32 mm, and an abutting end was set to be a triple stepped abutting end illustrated in FIG. 5.

Comparative Example 2

A seal ring, which has a trapezoidal cross-section made by inclining both side surfaces at an inclination angle of 5° so that a width in an axial direction is decreased from an outer circumferential side to an inner circumferential side, was manufactured by injection molding using a PEEK material into which carbon fibers are added. Further, an outer diameter (nominal diameter) of the seal ring was set to be 67 mm, a thickness (width in a diameter direction) was set to be 2.3 mm, a width (width in axial direction) was set to be 2.32 mm, and an abutting end was set to be a triple stepped abutting end illustrated in FIG. 5.

Comparative Example 3

Based upon Patent Literature 3, a seal ring, which has a concave portion structure in which the rotational direction side is formed as a gently inclined surface, and the opposite side in the rotational direction is formed as a sharply inclined surface, was manufactured by using a PEEK material into which carbon fibers are added. Here, eight concave portions in which a depth of the deepest portion is 0.15 mm, and a width in the circumferential direction is 5.0 mm were formed in the contact side surface. Further, an outer diameter (nominal diameter) of the seal ring was set to be 67 mm, a thickness (width in diameter direction) was set to be 2.3 mm, a width (width in axial direction) was set to be 2.32 mm, and an abutting end was set to be a triple stepped abutting end illustrated in FIG. 5.

Comparative Example 4

Based upon Patent Literature 3 (FIG. 8), a seal ring, which has a concave portion (first groove) in which the rotational direction side is a gently inclined surface, and the opposite side in the rotational direction is a sharply inclined surface, and a concave portion (second groove) in which the rotational direction side is a sharply inclined surface, and the opposite side in the rotational direction is a gently inclined surface, was manufactured by using a PEEK material into which carbon fibers are added. Here, eight first grooves and eight second grooves, in which a depth of the deepest portion is 0.15 mm, and a width in the circumferential direction is 5.0 mm, are alternately formed in the contact side surface of the seal ring, respectively. Further, an outer diameter (nominal diameter) of the seal ring was set to be 67 mm, a thickness (width in diameter direction) was set to be 2.3 mm, a width (width in axial direction) was set to be 2.32 mm, and an abutting end was set to be a triple stepped abutting end illustrated in FIG. 5.

(Measurement of Friction and Amount of Oil Leakage)

Figure 3:
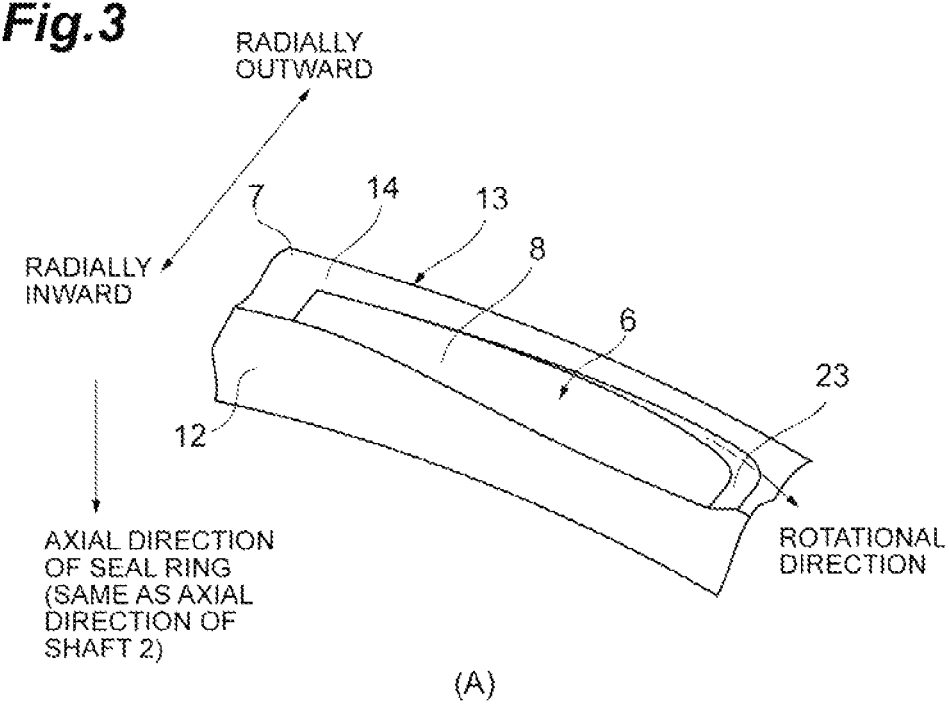
FIG. 3(A) is a partial perspective view illustrating an aspect of a seal ring of the present invention, as seen from the axis of the ring radially outwardly.
FIG. 3(B) is a side view looking at the inner circumferential surface of the ring of FIG. 3(A) from the axis of the ring radially outwardly, wherein the side view is a 3D view that is linearly developed on a 2D paper plane.
Figure 3:
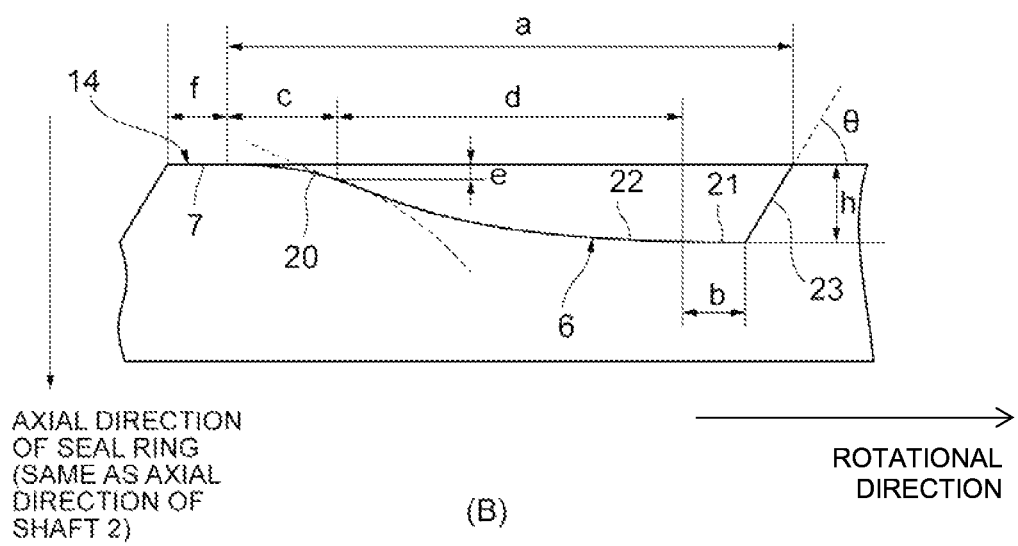
Figure 6:
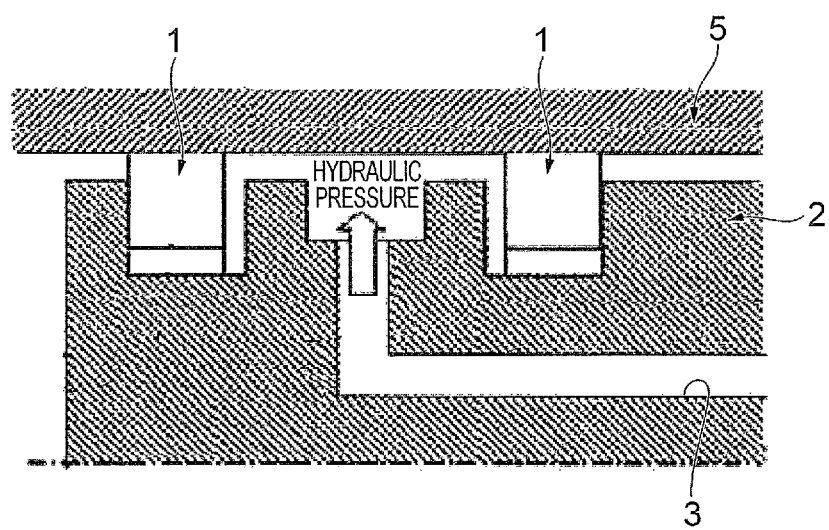
FIG. 6 is a schematic view illustrating a friction measurement apparatus.

As illustrated in FIG. 6, the seal rings in Example 1 and Comparative Examples 1 to 4 were mounted in the shaft groove formed in an outer circumferential surface of a stationary shaft (made of S45C) in which a hydraulic circuit is provided, and the seal ring was installed in a test apparatus. Here, the seal ring in Example 1 was installed so that a gently inclined surface including the squeezing portion becomes the opposite side in the rotational direction, as illustrated in FIG. 3, and meanwhile, the seal ring in Comparative Example 3 was installed so that a gently inclined surface becomes the rotational direction side. Next, a housing (made of S45C) was mounted and rotated at the number of revolutions of 2,000 rpm, and rotation torque and a loss were detected using a torque detector mounted to the test apparatus. Simultaneously, an amount of oil leakage was measured. An automatic transmission fluid (ATF) was used as oil, and a temperature of the oil was set to be 80° C., and pressure of the oil was set to be 0.8 MPa.

In the seal ring in Example 1, friction was reduced by 15% or more as compared to friction in the seal ring in Comparative Example 1. In the seal ring in Example 1, because when the seal ring is rotated, oil is squeezed to the tip of the squeezing portion, which is connected to the pillar portion at the opposite side in the rotational direction with a gently inclined curved surface, such that a lifting force is generated (wedge shape effect), friction is reduced. Further, it is understood that in the present configuration, because an area of the inclined surface of the rotational direction side, which tends to hinder a lubrication state, is reduced, a more excellent effect of reducing friction is obtained. In addition, in Comparative Example 3, friction is increased by about 15% as compared to friction in Comparative Example 1. It is understood that the reason is that in the configuration in Comparative Example 3 in which a gently inclined surface is disposed at the rotational direction side, and a sharply inclined surface is disposed at the opposite side in the rotational direction, a lifting force resulting from squeezing oil is not generated. It is acknowledged that in the seal ring in Comparative Example 4, friction is increased by about 5% as compared to friction in Comparative Example 1. It is understood that the cause is that an effect of reducing friction, which is generated in the concave portion in which the opposite side in the rotational direction is formed as a gently inclined surface, is offset by a reaction generated in the concave portion in which the rotational direction side is formed as a gently inclined surface, and in the present configuration, because the width in the circumferential direction of the concave portion is small, a sufficient lifting force is not generated even at the concave portion in which the opposite side in the rotational direction is formed as a gently inclined surface, and therefore an effect of reducing friction was low.

Further, similar to Comparative Example 1, an amount of oil leakage of the seal ring in Example 1 was reduced by about ⅔ of an amount of oil leakage in Comparative Example 2, and it was confirmed that the seal ring of the present invention also has excellent sealing characteristics. In addition, amounts of oil leakage of the seal rings in Comparative Examples 3 and 4 are the same level as that in Example 1.

Examples 2 to 5

Similar to Example 1, seal rings, which have a concave portion shape of a structure illustrated in FIG. 3(A), were manufactured by injection molding using a PEEK material into which carbon fibers are added. Here, a depth h of the deepest portion was set to be 0.02 mm (Example 2), 0.07 mm (Example 3), 0.25 mm (Example 4), and 0.40 mm (Example 5), respectively, by changing a curvature of the squeezing portion. Further, an outer diameter (nominal diameter) of the seal ring was set to be 67 mm, a thickness (width in diameter direction) was set to be 2.3 mm, a width (width in axial direction) was set to be 2.32 mm, and an abutting end was set to be a triple stepped abutting end illustrated in FIG. 5. The depth of the deepest portion in each Example was 0.9 (Example 2), 3.0 (Example 3), 10.8 (Example 4), and 17.2 (Example 5) when the width in the axial direction of the seal ring is set to be 100. Friction and an amount of oil leakage of the obtained seal ring are measured in the same manner as in Example 1.

Figure 7:
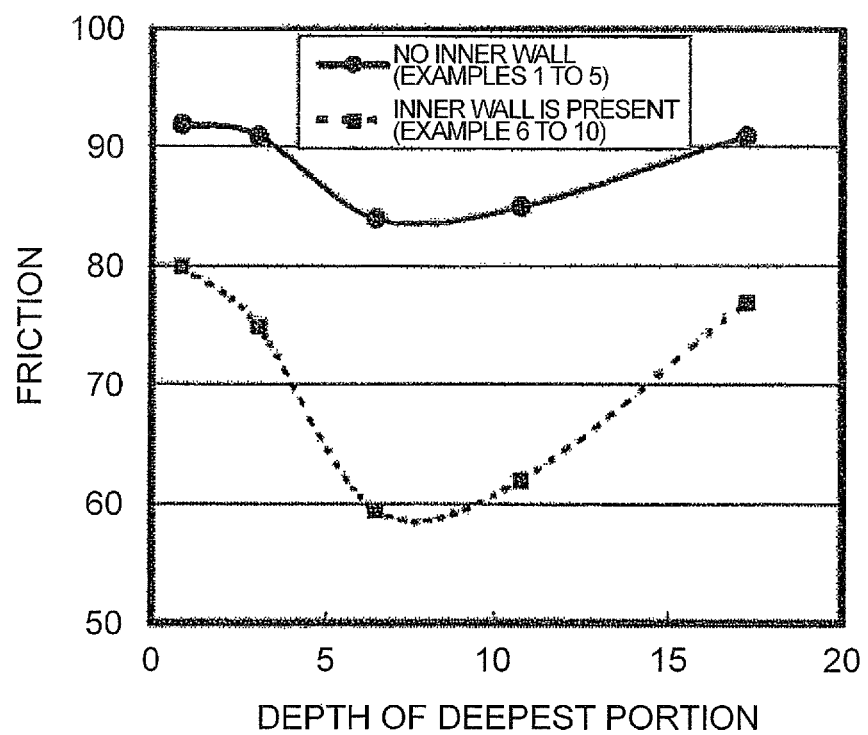
FIG. 7 is a graph illustrating a relationship between depths of deepest portions of seal rings of Examples 1 to 5 (●) and Examples 6 to 10(■) and friction.

A result of plotting a relationship between the depth h of the deepest portion of the seal ring in Examples 1 to 5 and friction is illustrated in FIG. 7 (●). Here, relative values obtained by setting friction of the seal ring in Comparative Example 1 to be 100 are illustrated in a vertical axis. Further, a relative value of the depth h of the deepest portion of the seal ring obtained by setting the width in the axial direction of the seal ring to be 100 is illustrated in a horizontal axis.

In the Examples of the present invention in which the end portion of the opposite side in the rotational direction of the concave portion is configured as the squeezing portion that is formed as a curved surface having a shape convex toward the pillar portion, and the rotational direction side is configured as a sharply inclined surface, it was confirmed that friction is reduced as compared to a concave portion shape of the related art. Particularly, when the width in the axial direction of the seal ring is set to be 100, friction was reduced when the depth h of the deepest portion ranges from 2 to 17, and a more excellent effect of reducing friction was recognized when the depth h thereof ranges from 5 to 10.

Meanwhile, amounts of oil leakage of the seal rings in Examples 1 to 5 were recognized to tend to be slightly increased by being inversely proportional to a reduction in friction, but are about ⅔ of an amount of oil leakage in Comparative Example 2, similar to Comparative Example 1, and it could be seen that the seal ring of the present invention has excellent sealing characteristics.

Examples 6 to 10

Seal rings, which have a concave portion shape of a structure illustrated in FIG. 4(A), were manufactured by injection molding using a PEEK material into which carbon fibers are added. An inner wall in which a width is 0.3 mm, and a length in the circumferential direction is 21 mm was provided along the inner circumferential end portion from the end portion of the opposite side in the rotational direction of the concave portion, and an oil introducing hole in which a length in the circumferential direction is 4 mm was formed in the rotational direction side. Here, by changing a curvature of the squeezing portion, a seal ring was manufactured in which a depth h of the deepest portion is 0.02 mm (Example 6), 0.07 mm (Example 7), 0.15 mm (Example 8), 0.25 mm (Example 9), and 0.40 mm (Example 10), respectively. Further, an outer diameter (nominal diameter) of the seal ring was set to be 67 mm, a thickness (width in diameter direction) was set to be 2.3 mm, a width (width in axial direction) was set to be 2.32 mm, and an abutting end was set to be a triple stepped abutting end illustrated in FIG. 5. Friction and an amount of oil leakage of each seal ring were measured in the same manner as in Example 1.

A result of measuring friction of the seal rings in Examples 6 to 10 is illustrated in FIG. 7 (■). Here, relative values obtained by setting friction of the seal ring in Comparative Example 1 to be 100 are illustrated in a vertical axis. Further, a relative value of the depth h of the deepest portion of the seal ring obtained by setting the width in the axial direction of the seal ring to be 100 is illustrated in a horizontal axis. It may be seen from FIG. 7 that friction is drastically reduced by providing the inner wall at the seal ring of the present invention. It is understood that the reason is that in the present Examples, because the end portion of the concave portion of the opposite side in the rotational direction is configured as a curved surface having a shape convex toward the pillar portion, and the pillar portion and the concave portion are connected with a gentle inclination angle, oil is more efficiently squeezed to the tip of the concave portion by providing the inner wall, such that a lifting force is increased, an oil film is easily formed on the pillar portion, and lubrication of the seal surface is efficiently made, thereby reducing a coefficient of friction. When the width in the axial direction of the seal ring is set to be 100, an excellent effect of reducing friction is recognized when the depth h of the deepest portion ranges from 2 to 17, the effect of reducing friction is more remarkable when the depth h thereof ranges from 5 to 10, and it could be seen that a reduction in friction by about 40% may be implemented in the present invention as compared to Comparative Example 1.

Further, amounts of oil leakage of the seal rings in Examples 6 to 10 were recognized to tend to be slightly increased by being inversely proportional to a reduction in friction, but are about ⅔ of an amount of oil leakage in Comparative Example 2, similar to Comparative Example 1, and it could be seen that the seal rings in the present Examples also have excellent sealing characteristics.

Examples 11 to 15

Seal rings having the same configuration as Example 8, except for setting lengths in the circumferential direction of the inner walls, which are provided at the opposite side in the rotational direction, to be 24 mm (Example 11), 15 mm (Example 12), 10 mm (Example 13), 6.6 mm (Example 14), and 3.3 mm (Example 15), respectively, were manufactured. Further, here, since the length in the circumferential direction of the concave portion is 25 mm, lengths in the circumferential direction of the inner walls in Examples 8, 11, 12, 13, 14 and 15 correspond to 84%, 96%, 60%, 40%, 26%, and 13% of the lengths in the circumferential direction of the concave portions, respectively. Friction and an amount of oil leakage of each seal ring were measured in the same manner as in Example 8.

Figure 8:
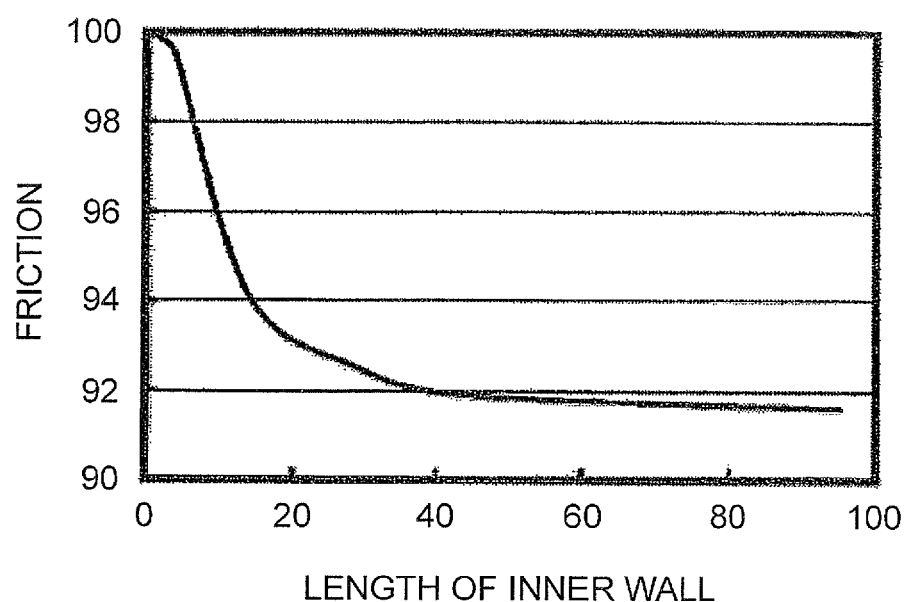
FIG. 8 is a graph illustrating a relationship between a length of an inner wall and friction.

A result of plotting a relationship between the length of the inner wall of the seal rings in Examples 8 and 11 to 14 and friction is illustrated in FIG. 8. Here, the length of each of the inner walls was illustrated as a relative value obtained by setting the length in the circumferential direction of the concave portion to be 100, and each friction was illustrated as a relative value obtained by setting the friction in Example 1 in which the inner wall is not present to be 100. An effect of reducing friction was recognized in all Examples in which the inner wall is provided at the opposite side in the rotational direction, as compared to Example 1 in which the inner wall is not present.

It could be seen that a more excellent effect of reducing friction is obtained by setting the length in the circumferential direction of the inner wall provided at the opposite side in the rotational direction to be 5 to 95, preferably 50 to 95 when the length in the circumferential direction of the concave portion is set to be 100. Typically, as a cancellation area becomes large, that is, an area where hydraulic pressure is applied becomes large, a pressure receiving load is reduced so that friction is reduced because a force to push back as an anti-pressure becomes large. However, in the seal ring of the present invention, a more excellent effect of reducing friction was recognized by a configuration in which a cancellation area is small, which elongates the inner wall. It is understood that the reason is that by providing the inner wall, an oil leakage to the inner circumferential surface is suppressed, and the oil is efficiently guided by the inclined surface of the squeezing portion. It is understood that for this reason, when the seal ring (shaft) rotates, a larger lifting force is applied such that an oil film is easily formed on the pillar portion, and the inner circumferential side of the seal ring is floated due to the formation of the oil film, and an intervention of oil on a ring-shaped seal surface, which is positioned at an outer circumferential side of the concave portion, is accelerated such that the sliding surface transits into in a fluid lubrication, and thus a coefficient of friction is reduced, and a high effect of reducing friction is obtained. That is, it is understood that an effect of reducing friction in the seal ring of the present invention greatly depends on a reduction in a coefficient of the friction by the lubrication of the sliding surface rather than a reduction in a pressing load. As such, in the seal ring of the present invention which may reduce friction with a smaller cancellation area, as compared to the seal ring of the related art which greatly depends on a cancellation area, limitation characteristics may be improved, or an amount of abrasion may be reduced.

Figure 9:
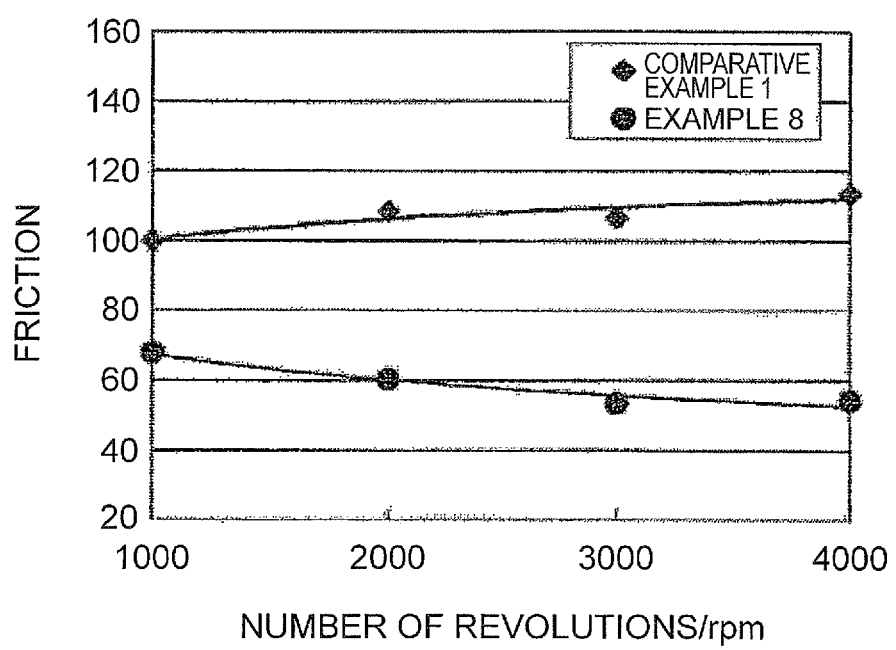
FIG. 9 is a graph illustrating a relationship between the numbers of revolutions of seal rings of Example 8 and Comparative Example 1 and friction.

FIG. 9 illustrates a result of measuring friction by changing the number of revolutions within a range of 1,000 rpm to 4,000 rpm for the seal ring in Example 8. For comparison, a result of measuring friction for the seal ring in Comparative Example 1 in the same manner is also illustrated in FIG. 5. Here, relative values obtained by setting friction of the seal ring in Comparative Example 1, in a state in which the seal ring is rotated at 1,000 rpm, to be 100 are illustrated in a horizontal axis. While in the seal ring of Comparative Example 1 of the related art, friction is increased together with an increase in the number of revolutions, it was confirmed from FIG. 9 that friction tends to be reduced when the number of revolution is increased, in the seal ring in Example 8 of the present invention. It is understood that the reason is that because in the seal ring in Example 8, a gently inclined surface having the wedge shape effect is formed only at the opposite side in the rotational direction where an effect of squeezing oil is excellent, and an oil film is easily formed, and further, the inner wall is provided, lubrication is not hindered at the rotational direction side, a lifting force is efficiently applied, and an oil film formed on the pillar portion becomes thick, thereby transiting into fluid lubrication. It is presumed that, in a fluid lubrication state, because a lifting force and a thickness of the oil film are increased together with an increase in the number of revolutions, friction is reduced.

Further, it could be seen that in the seal ring of the present invention, friction equal to or below friction of the seal ring in Comparative Example 2, which has a trapezoidal cross-section, is obtained and by the present invention, friction may be more reduced than the friction of the seal ring in the related art, which has a low friction specification.

REFERENCE SIGNS LIST

1 Seal ring
2 Shaft
3 Hydraulic pressure passage
4 Shaft groove
5 Housing
6 Concave portion (pocket)
7 Pillar portion
8 Inner wall
9 Oil introducing hole
11 Pressure receiving side surface
12 Inner circumferential surface
13 Contact side surface
14 Squeezing portion
21 Deepest portion
22 Inclined surface portion
51 Deepest inclined portion
52 Converging portion
60 Lifting force
61 Cancellation pressure

The invention claimed is:
1. A seal ring configured to be mounted in a shaft groove formed in an outer surface of a shaft, the seal ring comprising:
   an inner circumferential surface extending in a circumferential direction and around an axial direction of the seal ring;
   an outer circumferential surface extending in the circumferential direction and around the axial direction;
   a side surface connecting the inner circumferential surface and the outer circumferential surface, the side surface configured to come into contact with at least the shaft groove;
   a plurality of concave portions which are formed in the side surface at a side of the inner circumferential surface of the seal ring, the concave portions being spaced apart from each other in the circumferential direction of the seal ring, the seal ring rotatable in a rotational direction along the circumferential direction; and
   a plurality of pillar portions, each pillar portion disposed between a pair of adjacent concave portions among the plurality of concave portions,
   wherein each of the plurality of concave portions includes:
      a deepest portion having a largest depth in the axial direction of the seal ring, and
      first and second inclined surface portions positioned at both sides of the deepest portion in the rotational direction,
   the first inclined surface portion positioned at an upstream side in the rotational direction of the seal ring and the adjacent pillar portion are connected by a curved surface having a shape convex toward the pillar portion in the circumferential direction only, a width in the circumferential direction of the second inclined surface portion positioned at a downstream side in the rotational direction is smaller than a width in the circumferential direction of the first inclined surface portion, the first inclined surface portion is inclined in the circumferential direction only, and the deepest portion is a flat surface parallel to a surface of the adjacent pillar portion of the side surface.

2. The seal ring according to claim 1, wherein the depth in the axial direction of the deepest portion is 2 to 17 when a thickness in the axial direction of the seal ring is set to be 100.

3. The seal ring according to claim 1, wherein a width in the circumferential direction of each of the plurality of concave portions is 3 to 25 when an outer circumferential length of the seal ring is set to be 100.

4. The seal ring according to claim 1, wherein the number of concave portions of the plurality of concave portions is 4 to 16.

5. The seal ring according to claim 1, wherein each of the plurality of concave portions has an inner wall at an inner circumferential side on the upstream side in the rotational direction.

\* \* \* \* \*